United States Patent
Fukuda

(10) Patent No.: US 9,547,796 B2
(45) Date of Patent: Jan. 17, 2017

(54) PARKING ASSISTANCE DEVICE AND PARKING ASSISTANCE METHOD

(71) Applicant: Panasonic Corporation, Osaka (JP)

(72) Inventor: Hisaya Fukuda, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 140 days.

(21) Appl. No.: 14/389,048

(22) PCT Filed: Mar. 7, 2013

(86) PCT No.: PCT/JP2013/001478
§ 371 (c)(1),
(2) Date: Sep. 29, 2014

(87) PCT Pub. No.: WO2013/145582
PCT Pub. Date: Oct. 3, 2013

(65) Prior Publication Data
US 2015/0078624 A1  Mar. 19, 2015

(30) Foreign Application Priority Data
Mar. 30, 2012  (JP) ................. 2012-080814

(51) Int. Cl.
*G06K 9/00* (2006.01)
*B60R 1/00* (2006.01)
(Continued)

(52) U.S. Cl.
CPC ............ *G06K 9/00812* (2013.01); *B60R 1/00* (2013.01); *G08G 1/09626* (2013.01);
(Continued)

(58) Field of Classification Search
None
See application file for complete search history.

(56) References Cited

U.S. PATENT DOCUMENTS 7,366,595 B1  4/2008 Shimizu et al.
8,880,344 B2  11/2014 Mathes et al.
(Continued)

FOREIGN PATENT DOCUMENTS

DE  10 2010 034 140 A1  2/2012
DE  WO 2012019901 A1 *  2/2012  .......... G01C 21/367
(Continued)

OTHER PUBLICATIONS

International Search Report for Application No. PCT/JP2013/001478 dated Apr. 9, 2013.
(Continued)

*Primary Examiner* — Bhavesh Mehta
*Assistant Examiner* — Narek Zohrabyan
(74) *Attorney, Agent, or Firm* — Pearne & Gordon LLP

(57) ABSTRACT

A vehicle-in-question position detection unit (41) detects the position of the vehicle in question on the basis of GPS data acquired from a GPS receiver (3). An aerial photograph recording unit (43) records aerial photographs corresponding to the position of the vehicle in question. A peripheral object detection unit (42) produces a distance map on the basis of distance measurement data indicating the distance between a peripheral object and the vehicle in question obtained by a distance measurement sensor (2) mounted in the vehicle in question scanning the periphery. A peripheral map generation unit (44) updates past aerial photographs obtained from the aerial photograph recording unit (43) on the basis of the distance map, producing the latest peripheral map. The display device (5) displays the latest peripheral map at a screen.

12 Claims, 12 Drawing Sheets

(51) Int. Cl.
*G08G 1/0962* (2006.01)
*G08G 1/0967* (2006.01)
*G08G 1/16* (2006.01)

(52) U.S. Cl.
CPC . *G08G 1/096716* (2013.01); *G08G 1/096741* (2013.01); *G08G 1/096775* (2013.01); *G08G 1/168* (2013.01); *B60R 2300/806* (2013.01)

(56) References Cited

U.S. PATENT DOCUMENTS

| | | | |
|---|---|---|---|
| 2004/0059500 A1 | 3/2004 | Nakano | |
| 2006/0287825 A1 | 12/2006 | Shimizu et al. | |
| 2006/0287826 A1 | 12/2006 | Shimizu et al. | |
| 2009/0027404 A1 | 1/2009 | Hara et al. | |
| 2010/0321211 A1* | 12/2010 | Ko | G06T 3/4038 340/932.2 |
| 2010/0329510 A1* | 12/2010 | Schmid | B62D 15/0275 382/103 |
| 2012/0087546 A1* | 4/2012 | Focke | B60R 1/00 382/104 |
| 2013/0191022 A1* | 7/2013 | Mathes | G01C 21/26 701/532 |
| 2015/0022664 A1* | 1/2015 | Pflug | H04N 7/181 348/148 |

FOREIGN PATENT DOCUMENTS

| | | |
|---|---|---|
| JP | 2001-010427 A | 1/2001 |
| JP | 2004-53351 A | 2/2004 |
| JP | 2007-233539 A | 9/2007 |
| JP | 2008-033439 A | 2/2008 |

OTHER PUBLICATIONS

Supplementary European Search Report for Application No. EP 13769737.1 dated Mar. 4, 2015.

* cited by examiner

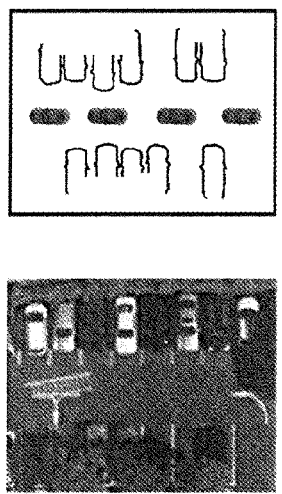
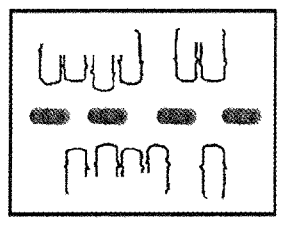
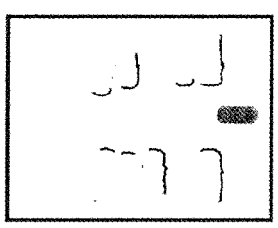
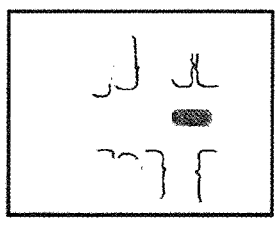
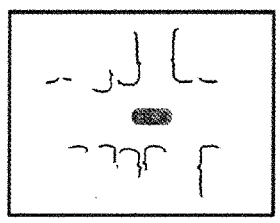
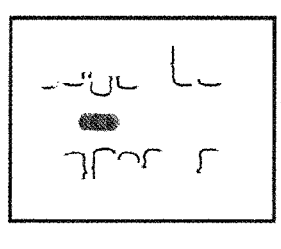
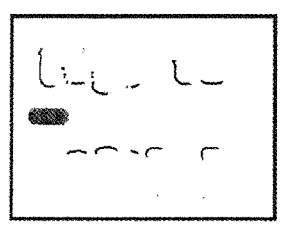
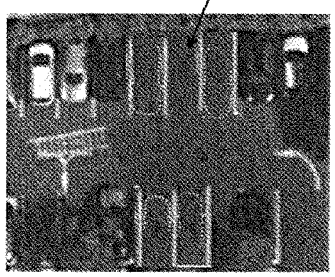
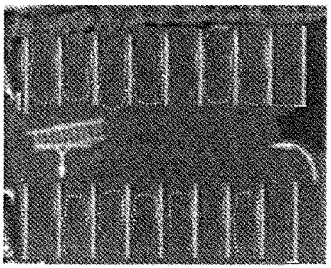

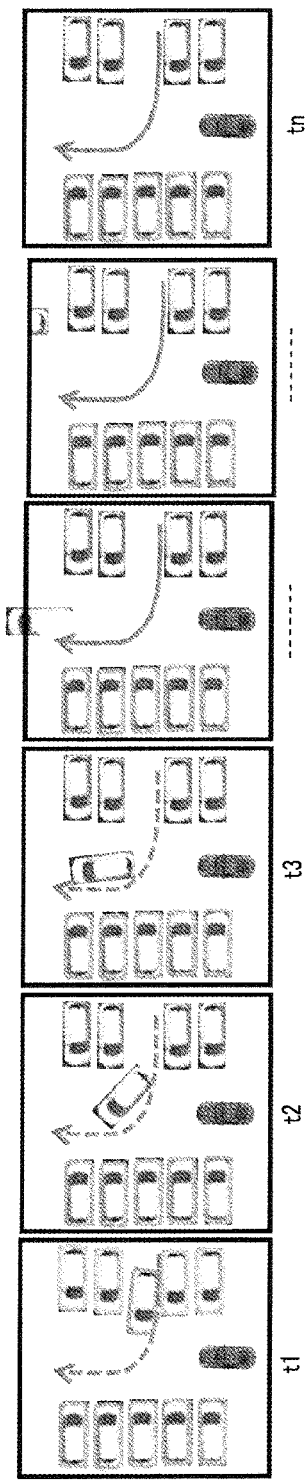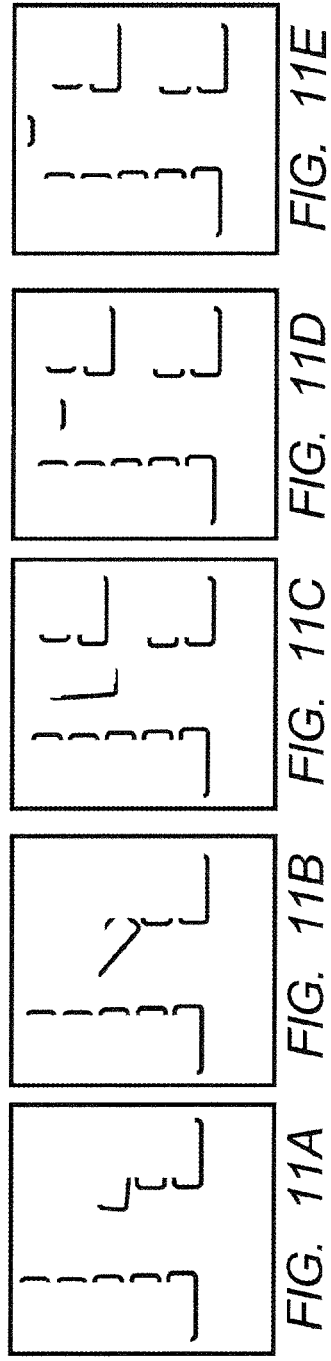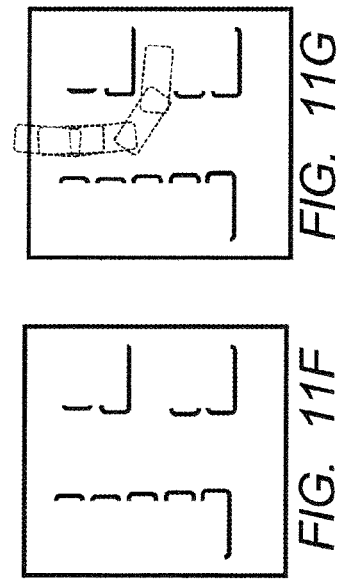
FIG. 11A  FIG. 11B  FIG. 11C  FIG. 11D  FIG. 11E  FIG. 11F  FIG. 11G

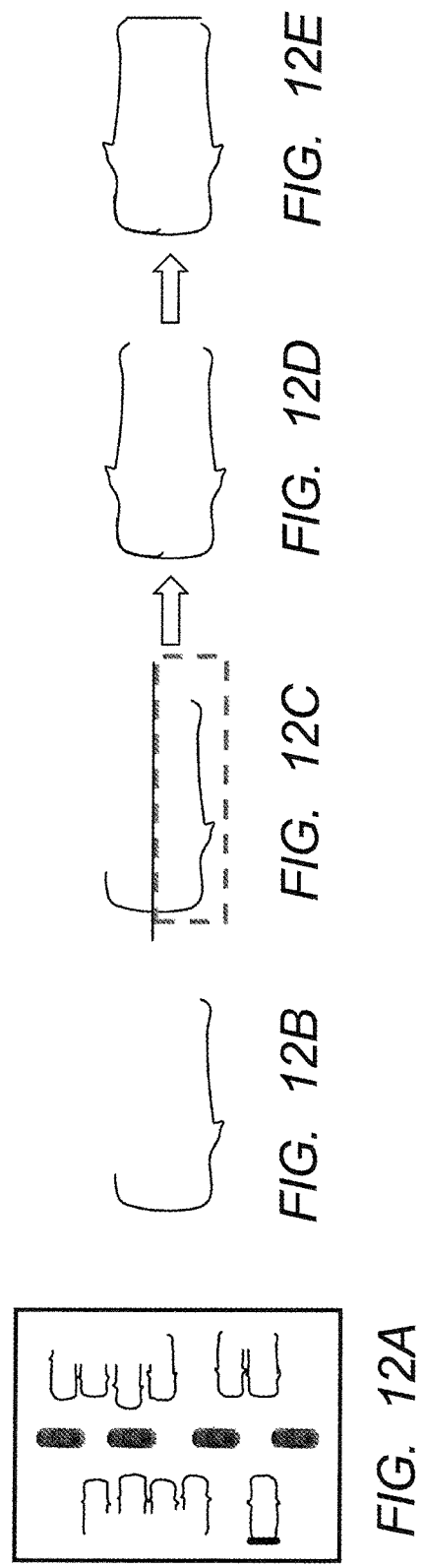

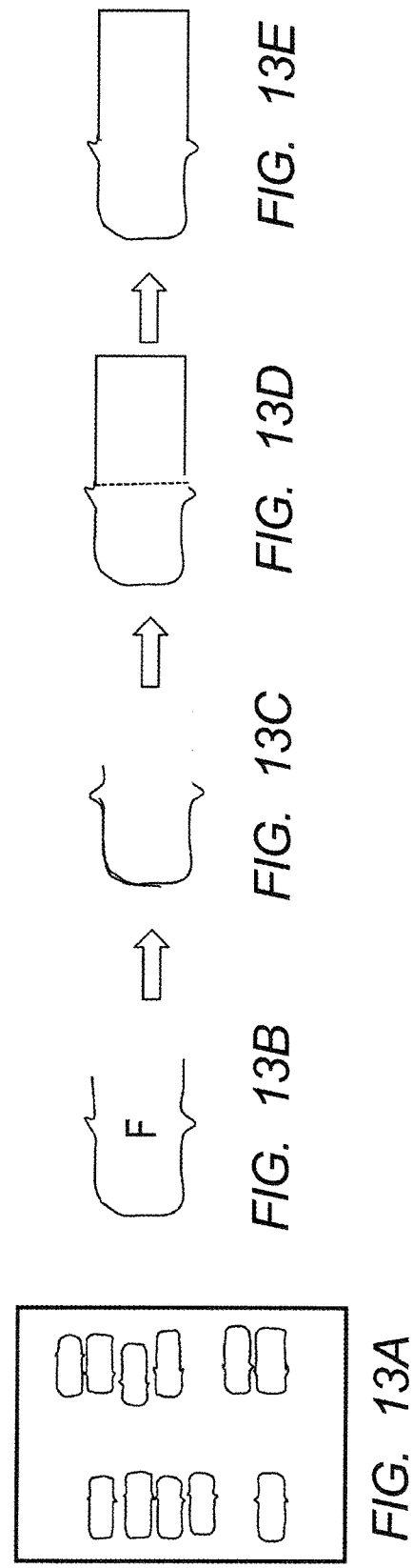

PARKING ASSISTANCE DEVICE AND PARKING ASSISTANCE METHOD

TECHNICAL FIELD

The present invention relates to a parking assistance apparatus and a parking assistance method for providing parking assistance for a vehicle using image information displayed on a display apparatus in the vehicle.

BACKGROUND ART

A conventionally known parking assistance apparatus provides, when a vehicle is being parked, parking assistance using image information displayed on a display apparatus such as a vehicle navigation system installed in a portion in front of a driver's seat of the vehicle. For example, the parking assistance apparatus displays vehicles adjacent to a parking space on the display apparatus in the vehicle, when the vehicle is being parked in a public parking lot or the like. At this time, the parking assistance apparatus draws a projection line to the ground on the basis of a photograph image taken by a camera installed in a back portion or the like of the vehicle. Alternatively, the parking assistance apparatus two-dimensionally models a display image using a vehicle shape inputted in advance, according to a schematic shape of each adjacent vehicle based on outer shape information obtained from the photograph image. Through such processing, the parking assistance apparatus provides a two-dimensional view taken from above (so-called top-view displaying) to provide parking assistance. Such a technique is disclosed in, for example, PTL 1.

According to other known techniques, photograph images taken by a plurality of cameras installed in front, back, right, and left portions or other portions of a vehicle are two-dimensionally modeled and displayed in top view on a display apparatus of the vehicle, or a composite image obtained by combining an aerial photograph with an image representing the current position of the vehicle is displayed on the display apparatus to provide parking assistance is provided.

CITATION LIST

Patent Literature

PTL 1
Japanese Patent Application Laid-Open No. 2001-010427

SUMMARY OF INVENTION

Technical Problem

In the case of a display image that is displayed in top view through two-dimensional view conversion or synthetic conversion using a photograph image taken by a camera installed in a back portion or the like of a vehicle, however, the camera cannot take the photograph image at a position sufficiently higher than peripheral three-dimensional objects, and hence a pattern formed by three-dimensional objects such as parked vehicles projected onto the ground may be superimposed on a pattern of the ground itself. In other words, in the case where the viewpoint of the photograph image taken by the camera is converted into top view, projection is made such that a projection image of height regions of the three-dimensional objects (such as the parked vehicles) is expanded onto a road surface, and hence a confusing three-dimensional texture is superimposed on a desired parking space on the display image. This makes it difficult to distinguish the pattern of the ground from the three-dimensional objects such as the parked vehicles, and hence the usability of the parking assistance apparatus becomes lower. Further, in the case where the photograph image taken by the camera installed in the back portion or the like of the vehicle is displayed in top view, a display area is narrowed because of a problem associated with the resolution of the camera, for example, and hence a parking target position becomes more difficult to check. That is, the photograph image is locally displayed, and hence the positional relation (distance and orientation) between the parking target position and the self-vehicle becomes more difficult to grasp. Furthermore, in the case of using an aerial photograph, the aerial photograph is generally past data, and thus is difficult to use in real-time without modification, and hence the usability is not high for the parking assistance apparatus.

An object of the present invention is to provide a parking assistance apparatus and a parking assistance method capable of providing parking assistance friendly to a driver by using real-time image information displayed on a display apparatus of a vehicle.

Solution to Problem

A parking assistance apparatus according to an aspect of the present invention is an apparatus for providing parking assistance for a self-vehicle using image information displayed inside the self-vehicle, the apparatus including: a self-vehicle position detecting section that detects a position of the self-vehicle; an aerial photograph storing section that stores therein an aerial photograph corresponding to the position of the self-vehicle detected by the self-vehicle position detecting section; a peripheral object detecting section that creates a distance map on a basis of distance measurement data acquired by scanning a periphery of the self-vehicle using a distance measurement sensor mounted on the self-vehicle, the distance measurement data indicating a distance between the self-vehicle and a peripheral object; a peripheral map generating section that updates the aerial photograph acquired from the aerial photograph storing section, on a basis of the distance map created by the peripheral object detecting section, and that generates a latest peripheral map; and a display section that displays, on a screen, the peripheral map generated by the peripheral map generating section.

A parking assistance apparatus according to an aspect of the present invention is an apparatus for providing parking assistance for a self-vehicle using image information displayed inside the self-vehicle, the apparatus including: a self-vehicle position detecting section that detects a position of the self-vehicle on a basis of GPS data acquired from a GPS; an aerial photograph acquiring section that acquires an aerial photograph corresponding to the position of the self-vehicle detected by the self-vehicle position detecting section, from an outside via a communication section; a peripheral object detecting section that creates a distance map on a basis of distance measurement data acquired by scanning a periphery of the self-vehicle using a distance measurement sensor mounted on the self-vehicle, the distance measurement data indicating a distance between the self-vehicle and a peripheral object; a peripheral map generating section that, on a basis of the distance map created by the peripheral object detecting section, updates the aerial photograph acquired from the aerial photograph acquiring section, and that generates a latest peripheral map; and a display section that displays, on a screen, the latest peripheral map generated by the peripheral map generating section.

A parking assistance method according to an aspect of the present invention is a method for providing parking assistance for a self-vehicle using image information displayed inside the self-vehicle, the method including: detecting a position of the self-vehicle; storing an aerial photograph corresponding to the position of the self-vehicle; creating a distance map on a basis of distance measurement data acquired by scanning a periphery of the self-vehicle using a distance measurement sensor mounted on the self-vehicle, the distance measurement data indicating a distance between the self-vehicle and a peripheral object; updating the aerial photograph on a basis of the distance map, and generating a peripheral map; and displaying the peripheral map on a display apparatus.

A parking assistance method according to an aspect of the present invention is a method for providing parking assistance for a self-vehicle using image information displayed inside the self-vehicle, the method including: detecting a position of the self-vehicle on a basis of GPS data acquired from a GPS; acquiring an aerial photograph corresponding to the position of the self-vehicle, from an outside via a communication section; creating a distance map on a basis of distance measurement data acquired by scanning a periphery of the self-vehicle using a distance measurement sensor mounted on the self-vehicle, the distance measurement data indicating a distance between the self-vehicle and a peripheral object; updating the aerial photograph on a basis of the distance map, and generating a latest peripheral map; and displaying the latest peripheral map on a display apparatus.

Advantageous Effects of Invention

According to the present invention, top-view displayed image information that is close to actual scenery and is real-time is monitored on a display apparatus of a vehicle. Hence, when the vehicle approaches a parking space, the positional relation between peripheral obstacles and the self-vehicle becomes easier to grasp. Further, when the vehicle is entering the parking space, avoidance of contact with adjacent vehicles can be easily judged. As a result, a parking assistance apparatus having extremely high usability can be achieved.

BRIEF DESCRIPTION OF DRAWINGS

FIGS. 10A to 10I are display screen views illustrating the state where a peripheral map generating process performed by a peripheral map generating section of a computation apparatus is displayed on the display apparatus;

FIGS. 11A to 11G are display screen views when pieces of time-series information about a moving vehicle (moving object) in a parking lot are merged together;

FIGS. 12A to 12E illustrate an example interpolation process for a non-sensing region; and FIGS. 13A to 13E illustrate another example interpolation process for a non-sensing region.

DESCRIPTION OF EMBODIMENTS

<<Outline>>

On the basis of a past aerial photograph taken at a sufficiently high camera position, a parking assistance apparatus according to an embodiment of the present invention updates, on the aerial photograph, data of a current actual environment (for example, whether or not a parked vehicle exists and the like) obtained by a global positioning system (GPS) and a distance measurement sensor. Consequently, distortion and blind spots of a three-dimensional object, which occur when an image is taken at a low camera position, can be eliminated, and a peripheral map closer to actual scenery can be displayed in top view on a display apparatus. Further, because a display image of the past aerial photograph is updated to a display image of the current environment, parking assistance for a vehicle can be properly provided.

Hereinafter, some embodiments of a parking assistance apparatus according to the present invention will be described in detail with reference to the accompanying drawings. Note that, throughout the accompanying drawings for describing the embodiments, the same elements are denoted by the same reference signs in principle, and repetitive description thereof will be omitted. Note that, in the case of describing a plurality of flowcharts, even overlapping contents may be repetitively described, in order to describe a series of operations in each flowchart.

(Embodiment 1)
<Configuration of Parking Assistance Apparatus>

Figure 1:
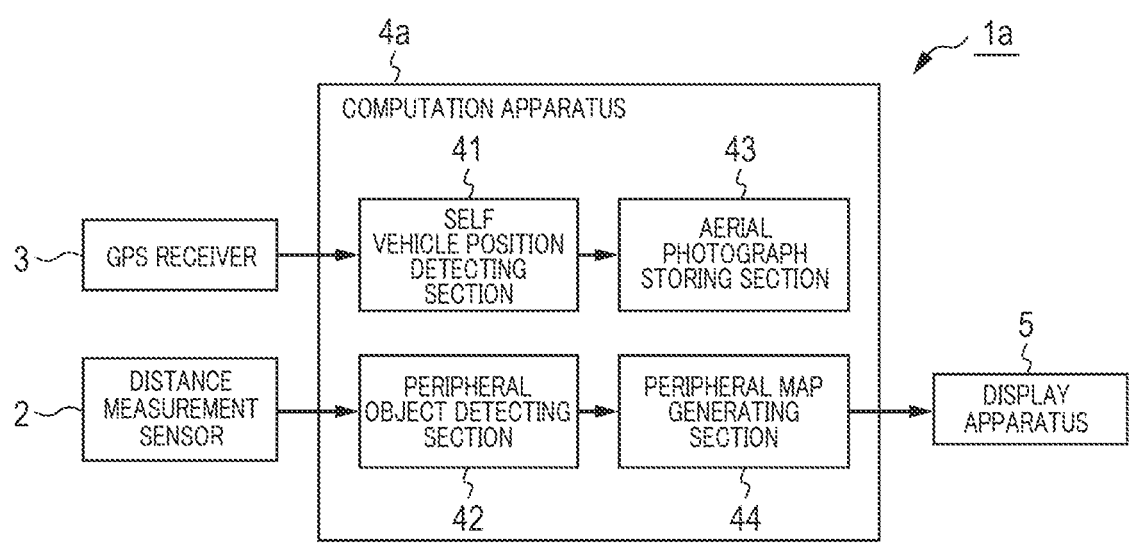
FIG. 1 is a block diagram illustrating a configuration of a parking assistance apparatus and related elements according to Embodiment 1 of the present invention.

FIG. 1 is a block diagram illustrating a configuration of a parking assistance apparatus and related elements according to Embodiment 1 of the present invention. In parking assistance apparatus 1a illustrated in FIG. 1, past aerial photographs are stored in advance in computation apparatus 4a. Parking assistance apparatus 1a is mounted in a vehicle, and mainly includes distance measurement sensor 2, GPS receiver 3, computation apparatus 4a, and display apparatus 5. Distance measurement sensor 2 scans the periphery of the vehicle by means of, for example, a laser radar, and measures the distance (positional relation) between the vehicle and each peripheral object. GPS receiver 3 acquires GPS data. Computation apparatus 4a acquires the distance measurement data from distance measurement sensor 2 and the GPS data from GPS receiver 3, and generates image data. Display apparatus 5 acquires the image data from computation apparatus 4a, and displays the image on a display.

Computation apparatus 4a includes self-vehicle position detecting section 41, peripheral object detecting section 42, aerial photograph storing section 43, and peripheral map generating section 44. self-vehicle position detecting section 41 detects the current position of the vehicle in which parking assistance apparatus 1a is mounted (hereinafter, referred to as "target vehicle") on the basis of the GPS data acquired from GPS receiver 3. Peripheral object detecting section 42 acquires the distance measurement data from distance measurement sensor 2, detects the distance between the self-vehicle and a current peripheral object, and creates a distance map. Aerial photograph storing section 43 stores therein past aerial photographs of a large number of areas including an aerial photograph corresponding to the position of the self-vehicle detected by self-vehicle position detecting section 41. Peripheral map generating section 44 updates the past aerial photograph on the basis of: the past aerial photograph corresponding to the current position of the self-vehicle, which is acquired from aerial photograph storing section 43; and the distance map of the current peripheral object, which is acquired from peripheral object detecting section 42, generates a current peripheral map, and transmits the peripheral map to display apparatus 5.

<Operation of Parking Assistance Apparatus when Moving Object does not Exist>

Figure 2:
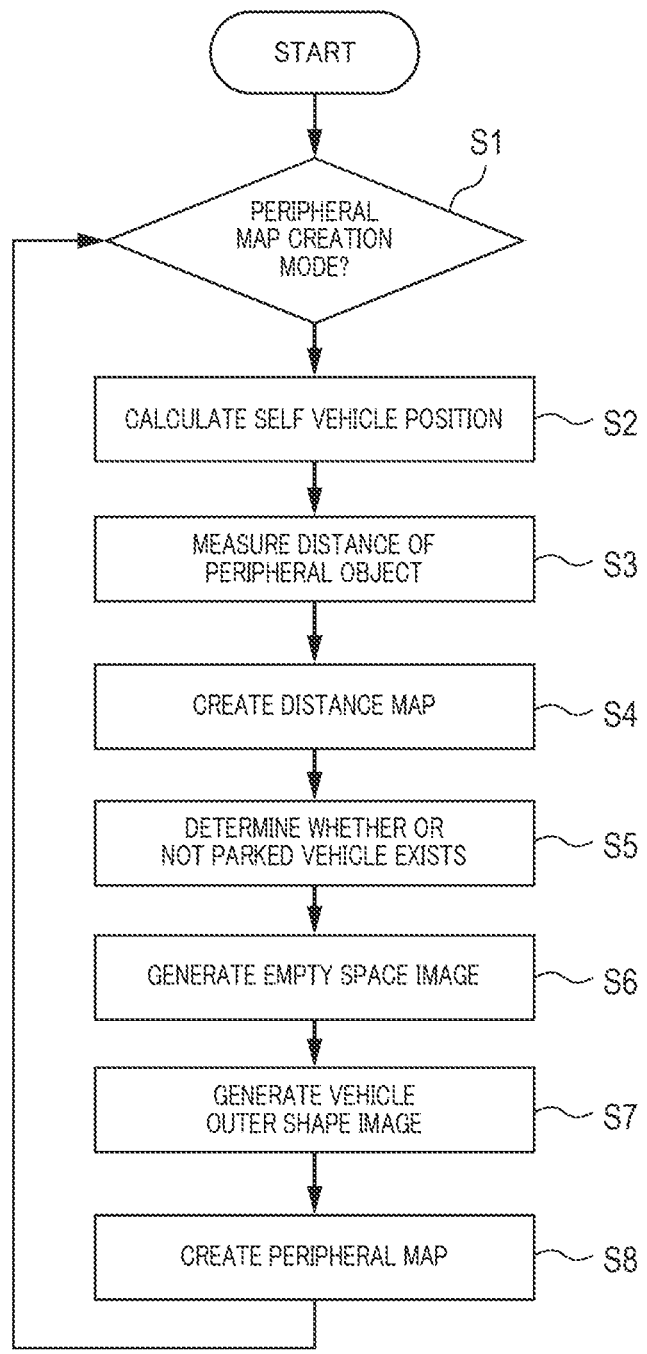
FIG. 2 is a flowchart showing an operation flow when a moving object does not exist, in the parking assistance apparatus of Embodiment 1 illustrated in FIG. 1.

Next, an operation flow of parking assistance apparatus 1a illustrated in FIG. 1 is described with reference to a flowchart. FIG. 2 is a flowchart showing an operation flow when a moving object does not exist, in parking assistance apparatus 1a of Embodiment 1 illustrated in FIG. 1. First, computation apparatus 4a determines whether or not parking assistance apparatus 1a is in a peripheral map creation mode (Step S1). Subsequently, if computation apparatus 4a determines that parking assistance apparatus 1a is in the peripheral map creation mode, self-vehicle position detecting section 41 of computation apparatus 4a calculates the current position of the self-vehicle on the basis of the GPS data acquired from GPS receiver 3 (Step S2).

Distance measurement sensor 2 mounted on the self-vehicle scans the periphery of the self-vehicle by means of, for example, a laser radar, and measures the distance between the self-vehicle and each object in the peripheral area (Step S3). Then, if distance measurement sensor 2 transmits the distance measurement data to peripheral object detecting section 42, peripheral object detecting section 42 creates a distance map on the basis of the distance measurement data indicating the distance between the self-vehicle and each object in the peripheral area (Step S4). Further, peripheral object detecting section 42 determines whether or not a parked vehicle exists in the periphery of the self-vehicle, on the basis of the created distance map (Step S5).

Peripheral map generating section 44 then generates an empty space image using the distance map indicating whether or not a peripheral parked vehicle exists, which is created by peripheral object detecting section 42, on the basis of the past aerial photograph corresponding to the current position of the self-vehicle, which is acquired from aerial photograph storing section 43 (Step S6). Further, peripheral map generating section 44 generates an outer shape image of the vehicle on the basis of the empty space image (Step S7). Then, peripheral map generating section 44 creates a peripheral map updated to the current aerial photograph, on the basis of the past aerial photograph, the empty space image, and the outer shape image of the vehicle (Step S8), and transmits the peripheral map to display apparatus 5. In this way, display apparatus 5 can display the peripheral map close to current scenery in top view.

<Operation of Parking Assistance Apparatus Taking Influence of Moving Object into Consideration>

Figure 3:
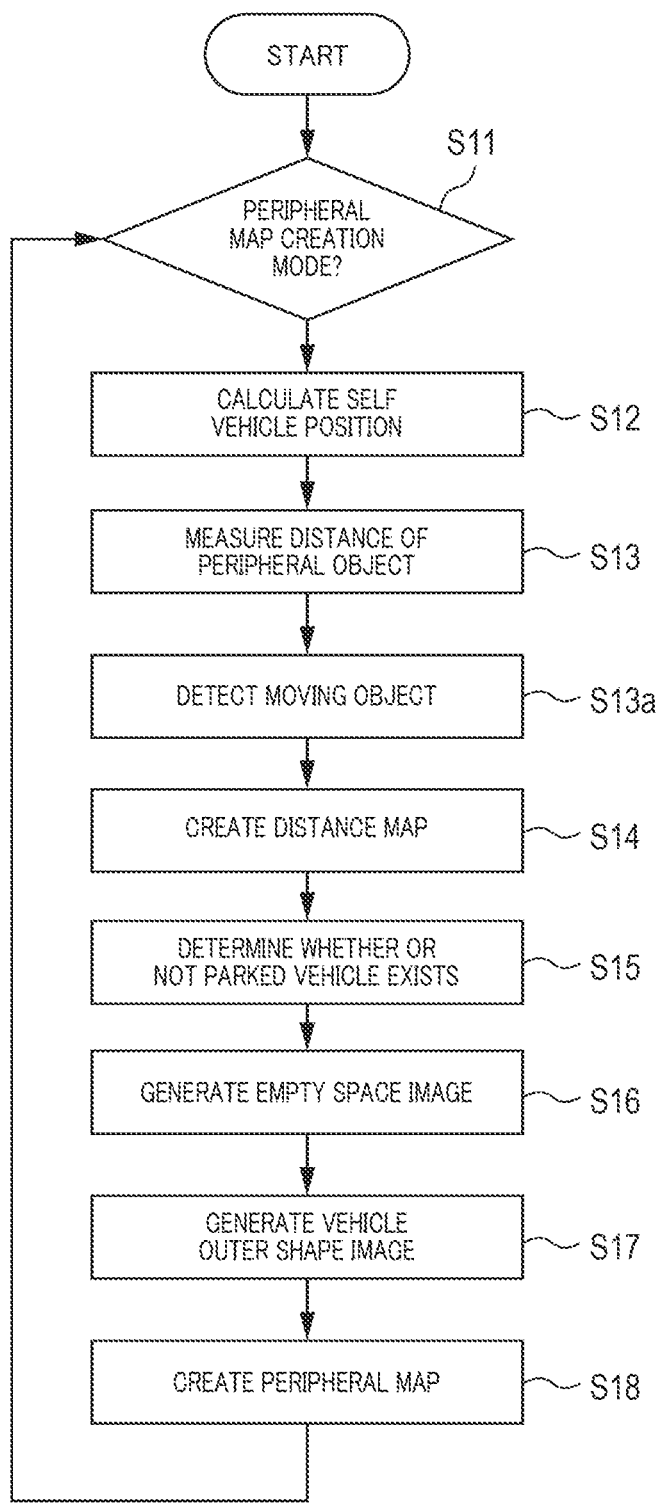
FIG. 3 is a flowchart showing an operation flow when the influence of a moving object is considered, in the parking assistance apparatus of Embodiment 1 illustrated in FIG. 1.

FIG. 3 is a flowchart showing an operation flow when the influence of a moving object is considered, in parking assistance apparatus 1a of Embodiment 1 illustrated in FIG. 1. In the operation flow illustrated in FIG. 3 when the influence of the moving object is taken into consideration, a moving object detecting step (Step S13a in FIG. 3) is added to the flowchart of FIG. 2. Some operation contents in the flowchart of FIG. 3 are different from those in the flowchart of FIG. 2 because of the addition of the moving object detecting step, and hence description is given throughout the flowchart of FIG. 3.

In FIG. 3, first, computation apparatus 4a determines whether or not parking assistance apparatus 1a is in the peripheral map creation mode (Step S11). Subsequently, if computation apparatus 4a determines that parking assistance apparatus 1a is in the peripheral map creation mode, self-vehicle position detecting section 41 of computation apparatus 4a calculates the current position of the self-vehicle on the basis of the GPS data acquired from GPS receiver 3 (Step S12).

Distance measurement sensor 2 mounted on the self-vehicle scans the periphery of the self-vehicle by means of the laser radar, and measures the distance between the self-vehicle and each object in the peripheral area (Step S13). Further, distance measurement sensor 2 scans the periphery of the self-vehicle by means of the laser radar, to thereby detect whether or not a moving object (for example, a vehicle that is entering or going out of a parking space and the like) exists (Step S13a). Then, if distance measurement sensor 2 transmits the distance measurement data and the information as to whether or not a moving object exists to peripheral object detecting section 42, peripheral object detecting section 42 creates a latest distance map on the basis of: the distance measurement data indicating the distance between the self-vehicle and each object in the peripheral area; and the information as to whether or not a moving object exists. For example, if a moving object exists, peripheral object detecting section 42 creates the latest distance map such that movement information of the moving object is reflected (Step S14). Further, peripheral object detecting section 42 determines whether or not a parked vehicle exists in the periphery of the self-vehicle, on the basis of the created latest distance map (Step S15).

Peripheral map generating section 44 then generates an empty space image using the latest distance map indicating whether or not a peripheral parked vehicle exists, which is created by peripheral object detecting section 42, on the basis of the past aerial photograph corresponding to the current position of the self-vehicle, which is acquired from aerial photograph storing section 43 (Step S16). Further, peripheral map generating section 44 generates an outer shape image of the vehicle on the basis of the empty space image (Step S17). Then, peripheral map generating section 44 creates a latest peripheral map updated to the current aerial photograph, on the basis of the past aerial photograph, the empty space image, and the outer shape image of the vehicle (Step S18), and transmits the peripheral map to display apparatus 5. In this way, if a moving object exists, display apparatus 5 can display the latest updated image in top view such that a movement trace of the moving object does not remain.

(Embodiment 2)

Figure 4:
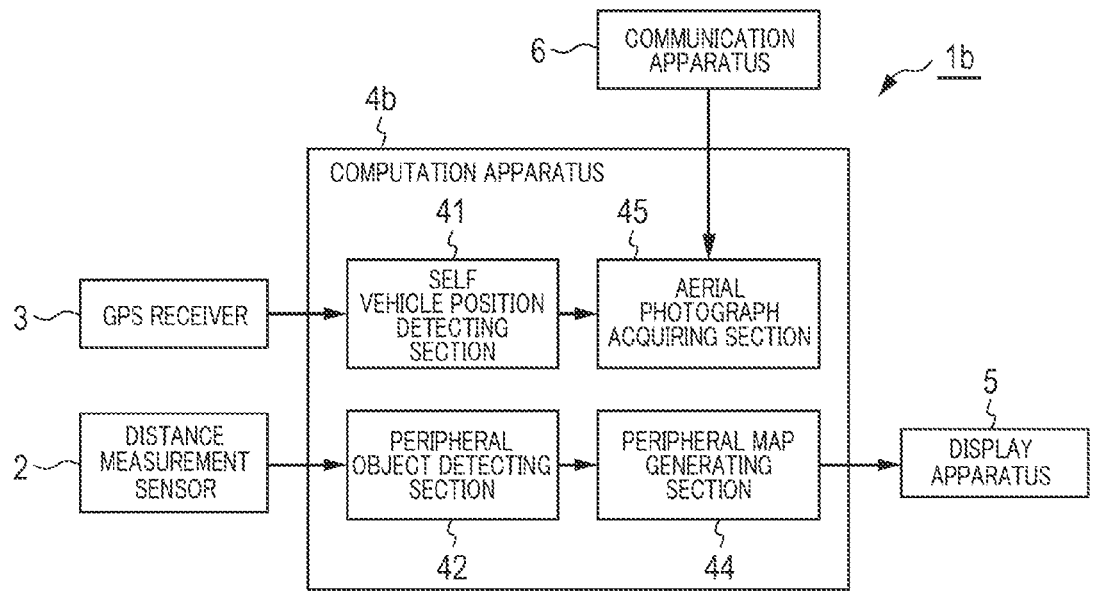
FIG. 4 is a block diagram illustrating a configuration of a parking assistance apparatus and related elements according to Embodiment 2 of the present invention.

FIG. 4 is a block diagram illustrating a configuration of a parking assistance apparatus and related elements according to Embodiment 2 of the present invention. As illustrated in FIG. 4, the configuration of parking assistance apparatus 1b and the related elements includes distance measurement sensor 2, GPS receiver 3, computation apparatus 4b, display apparatus 5, and communication apparatus 6. Computation apparatus 4b includes self-vehicle position detecting section 41, peripheral object detecting section 42, peripheral map generating section 44, and aerial photograph acquiring section 45.

That is, parking assistance apparatus 1a of Embodiment 1 illustrated in FIG. 1 has a configuration in which aerial photograph storing section 43 of computation apparatus 4a stores therein the large number of aerial photographs, whereas parking assistance apparatus 1b of Embodiment 2 illustrated in FIG. 4 has a configuration in which aerial photograph acquiring section 45 of computation apparatus 4b acquires a desired aerial photograph from communication apparatus 6 each time. Accordingly, elements other than communication apparatus 6 and aerial photograph acquiring section 45 are the same as those in FIG. 1, and hence overlapping description is omitted.

In parking assistance apparatus 1b of Embodiment 2, aerial photograph acquiring section 45 acquires a past aerial photograph corresponding to the position of the self-vehicle detected by self-vehicle position detecting section 41, from the outside via communication apparatus 6 each time. Accordingly, in Step S8 (Step S18) in the flowchart of FIG. 2 (FIG. 3) described above, peripheral map generating section 44 updates the past aerial photograph on the basis of: the past aerial photograph that is acquired by aerial photograph acquiring section 45 from the outside via communication apparatus 6; the empty space image; and the outer shape image of the vehicle, and creates a latest peripheral map. The other operation is the same as that in Embodiment 1, and hence overlapping description is omitted. In the case where a new parking lot is provided and other such cases, the use of an old aerial photograph leads to improper parking assistance. Hence, a latest aerial photograph is acquired from the outside via communication apparatus 6. As a result, proper parking assistance based on the latest information can be provided.

(Embodiment 3)

Figure 5:
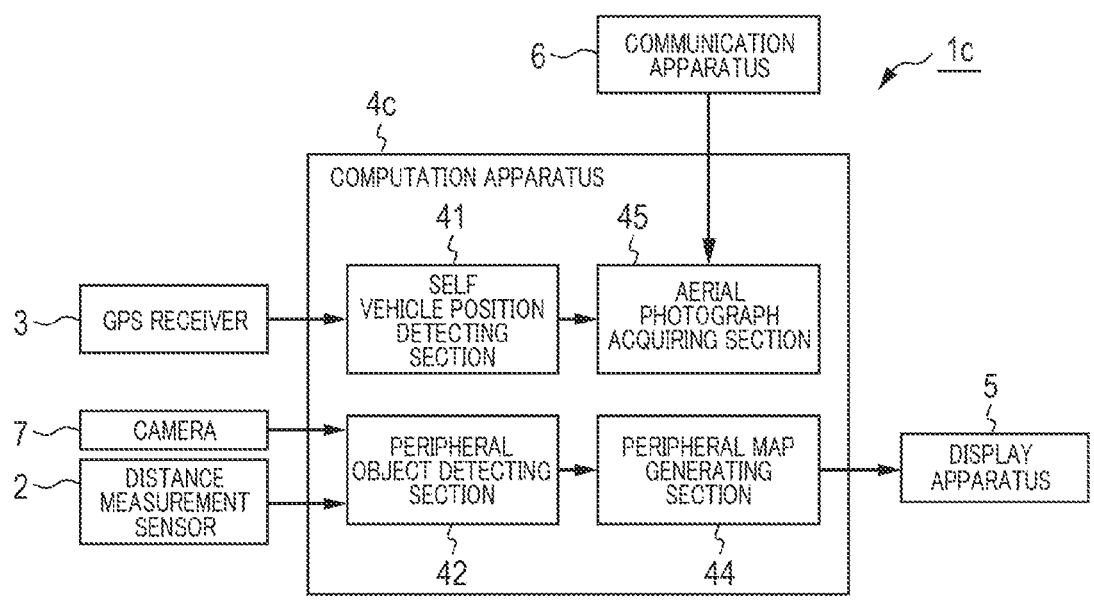
FIG. 5 is a block diagram illustrating a configuration of a parking assistance apparatus and related elements according to Embodiment 3 of the present invention.

FIG. 5 is a block diagram illustrating a configuration of a parking assistance apparatus and related elements according to Embodiment 3 of the present invention. Parking assistance apparatus 1c of Embodiment 3 has a configuration in which camera 7 is added to parking assistance apparatus 1b illustrated in FIG. 4. Accordingly, peripheral map generating section 44 generates a latest peripheral map such that a peripheral condition based on a color photograph image taken by camera 7 is reflected in addition to the past aerial photograph that is acquired by aerial photograph acquiring section 45 from the outside via communication apparatus 6. Hereinafter, an operation of parking assistance apparatus 1c when an aerial photograph and a photograph image are used in combination is described with reference to a flowchart.

<Operation of Parking Assistance Apparatus when Peripheral Condition is Acquired by Camera>

Figure 6:
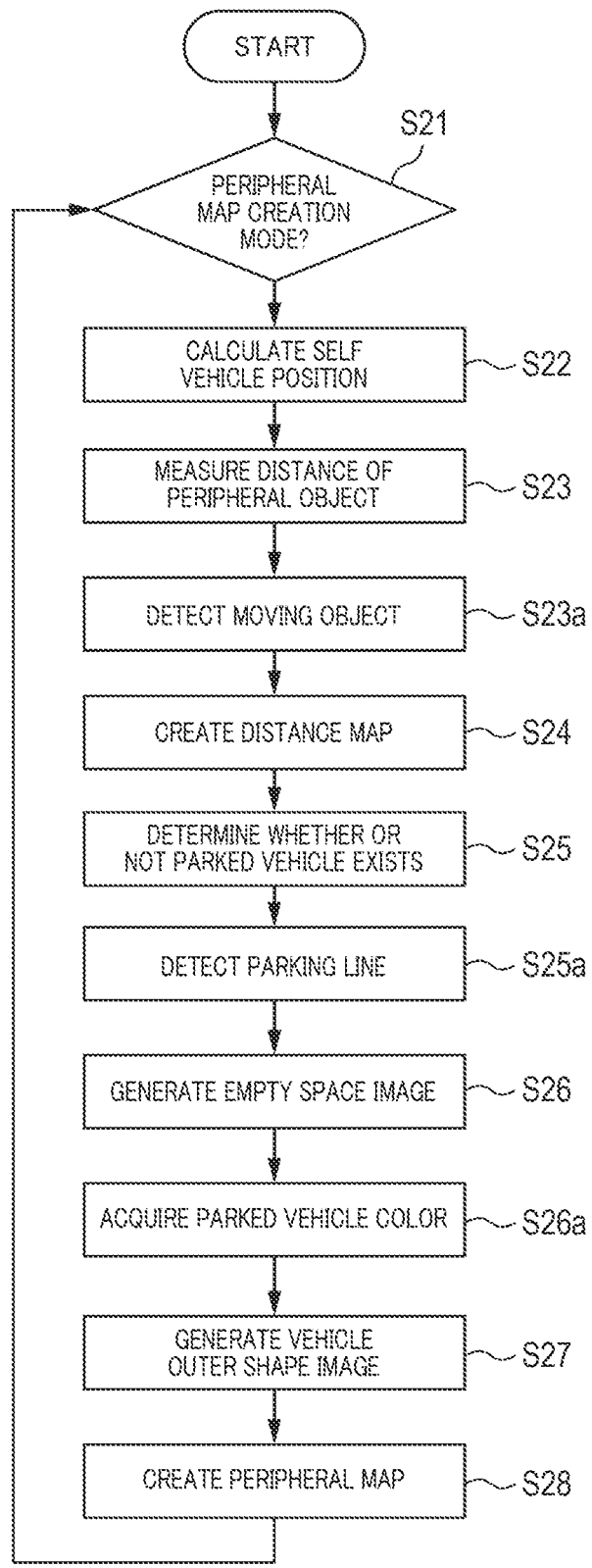
FIG. 6 is a flowchart showing an operation flow when a peripheral condition is acquired by a camera, in the parking assistance apparatus of Embodiment 3 illustrated in FIG. 5.

FIG. 6 is a flowchart showing an operation flow when the peripheral condition is acquired by the camera, in the parking assistance apparatus 1c of Embodiment 3 illustrated in FIG. 5. In the operation flow illustrated in FIG. 6 when the peripheral condition is acquired by the camera, a parking line detecting step (Step S25a in FIG. 6) and an acquiring step of parked vehicle color information (Step S26a in FIG. 6) are added to the flowchart of FIG. 3, and description is given throughout all the steps in order to clarify a flow of a series of operations.

In FIG. 6, computation apparatus 4c first determines whether or not parking assistance apparatus 1c is in the peripheral map creation mode (Step S21). Subsequently, if computation apparatus 4c determines that parking assistance apparatus 1c is in the peripheral map creation mode, self-vehicle position detecting section 41 of computation apparatus 4c calculates the current position of the self-vehicle on the basis of the GPS data acquired from GPS receiver 3 (Step S22).

Distance measurement sensor 2 mounted on the self-vehicle scans the periphery of the self-vehicle by means of the laser radar, and measures the distance between the self-vehicle and each object in the peripheral area (Step S23). Further, distance measurement sensor 2 scans the periphery of the self-vehicle by means of the laser radar, to thereby detect whether or not a moving object (for example, a vehicle that is entering or going out of a parking space and the like) exists (Step S23a). Then, if distance measurement sensor 2 transmits the distance measurement data and the information as to whether or not a moving object exists to peripheral object detecting section 42, peripheral object detecting section 42 creates a latest distance map on the basis of: the distance measurement data indicating the distance between the self-vehicle and each object in the peripheral area; and the information as to whether or not a moving object exists. For example, if a moving object exists, peripheral object detecting section 42 creates the latest distance map such that movement information of the moving object is reflected (Step S24).

Further, peripheral object detecting section 42 determines whether or not a parked vehicle exists in the periphery of the self-vehicle, on the basis of the created latest distance map (Step S25). Then, peripheral object detecting section 42 detects a parking line for an empty space in which a parked vehicle does not exist (Step S25a).

Peripheral map generating section 44 then generates an empty space image using: the latest distance map indicating whether or not a peripheral parked vehicle exists; and the parking line, which are detected by peripheral object detecting section 42, on the basis of the past aerial photograph corresponding to the current position of the self-vehicle, which is acquired from aerial photograph acquiring section 45 (Step S26). Further, peripheral map generating section 44 fills an inside zone surrounded by the parking line with an empty texture such that the parking line of the empty space image is not erased, and acquires color information of an adjacent parked vehicle on the basis of the color photograph image taken by camera 7 (Step S26a). Peripheral map generating section 44 then fills the inside of the profile of the adjacent vehicle with substantially the same color as that of the adjacent vehicle, and generates an outer shape image of the vehicle (Step S27). The "adjacent parked vehicle" in this case refers to a parked vehicle whose image is taken by camera 7 and to a parked vehicle whose profile can be extracted.

Peripheral map generating section 44 then updates the past aerial photograph on the basis of the past aerial photograph, the empty space image, and the outer shape image of the vehicle, creates a latest peripheral map (Step S28), and transmits the peripheral map to display apparatus 5. In this way, if a moving object exists, display apparatus 5 can display the latest updated image in top view such that a movement trace of the moving object does not remain.

EXAMPLES

Figure 7:
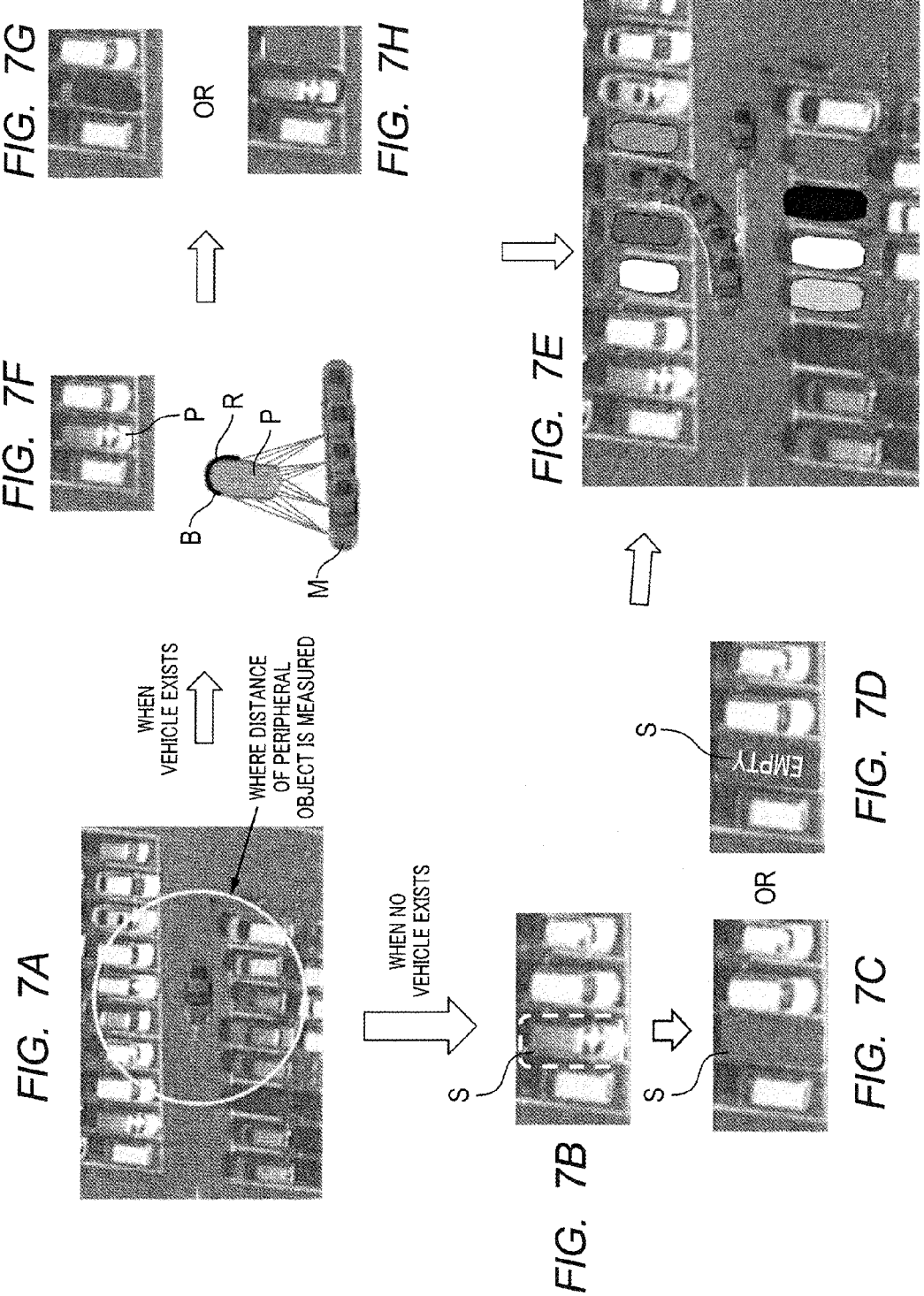
FIGS. 7A to 7H illustrate an example display screen that is displayed on a display apparatus at a driver's seat when a vehicle on which the parking assistance apparatus of the present embodiment is mounted is being parked into a public parking lot.

Next, specific examples of the parking assistance apparatus implemented by each of the above-mentioned embodiments are described. FIGS. 7A to 7H illustrate an example display screen that is displayed on a display apparatus at a driver's seat when a vehicle on which the parking assistance apparatus of the present embodiment is mounted is being parked into a public parking lot. If the vehicle (hereinafter, referred to as "target vehicle") enters the parking lot, first, as illustrated in FIG. 7A, a past aerial photograph that is an original photograph is displayed as a top-view screen on the display apparatus at the driver's seat of the self-vehicle. Further, an area in which a distance measurement sensor of the self-vehicle scans the periphery thereof and measures the distance of each peripheral object is displayed as a circumferential range on the aerial photograph. At this time, in the case where a vehicle does not exist in any of the parking spaces in the circumferential range, as illustrated in FIG. 7B, a broken line is displayed around a region S of the parking space in which a vehicle does not exist.

Subsequently, as illustrated in FIG. 7C, an image including a texture of substantially the same color as that of the peripheral road surface is superimposed onto the region S of the parking space around which the broken line is displayed. Alternatively, as illustrated in FIG. 7D, for example, an image including character information of "EMPTY" may be superimposed onto the region S of the parking space around which the broken line is displayed, in order to inform a user that the parking space is empty. Then, as illustrated in FIG. 7E, the state where the self-vehicle is entering the parking space on which the texture of the public parking lot or "EMPTY" is superimposed is displayed on the screen of the display apparatus of the self-vehicle.

Figure 8:
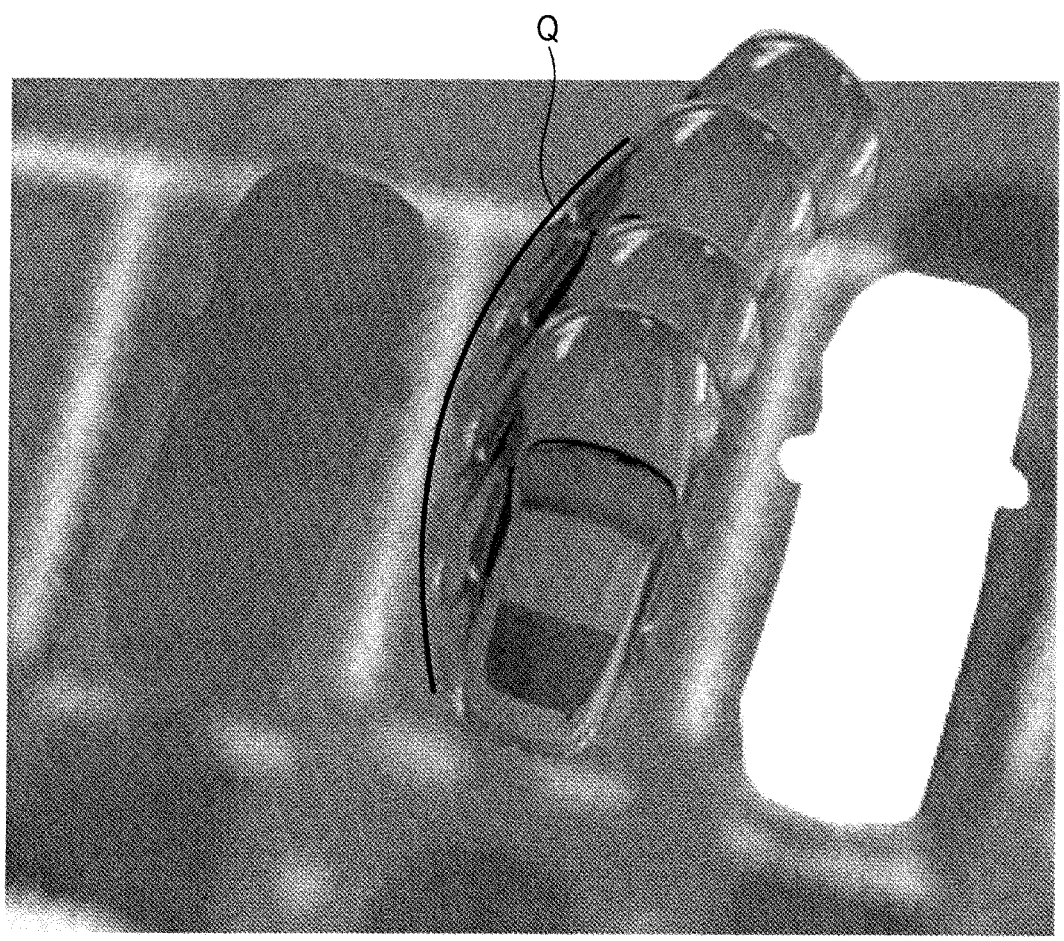
FIG. 8 is a display screen view illustrating the state where entrance into a parking space illustrated in FIG. 7E is displayed in an enlarged manner on the display apparatus.

Meanwhile, in the case where a vehicle exists in every parking space within the circumferential range of the peripheral distance measurement on the aerial photograph that is the original photograph in FIG. 7A, the following operation is performed. That is, as illustrated in FIG. 7F, a vehicle P that exists in a parking space is sensed by a distance measurement sensor of a self-vehicle M, a blind spot that is a portion that cannot be sensed as a result of the sensing (for example, a back region B of the vehicle P) is estimated as a left-right symmetric back region of the vehicle P, and a profile R thereof having maximum outer shape dimensions is displayed. Then, as illustrated in FIG. 7G, the profile region is filled with a desired color (for example, red). Alternatively, as illustrated in FIG. 7H, the profile that can be measured is superimposed onto the profile region. Note that, in the case where a past vehicle is on the aerial photograph that is the original photograph, the image including the texture of substantially the same color as that of the peripheral road surface may be superimposed at the position of the past vehicle, and then the profile may be superimposed thereat. This can prevent the picture of the past vehicle from remaining FIG. 8 is a display screen view illustrating the state where the entrance into the parking space illustrated in FIG. 7E is displayed in an enlarged manner on the display apparatus. That is, in the case where the self-vehicle is entering the parking space, the outer edge of the movement trace of the self-vehicle observed from above is displayed as a profile Q as the top-view display screen illustrated in FIG. 8, whereby the self-vehicle can enter the parking space while avoidance of contact with adjacent vehicles is checked.

Figure 9:
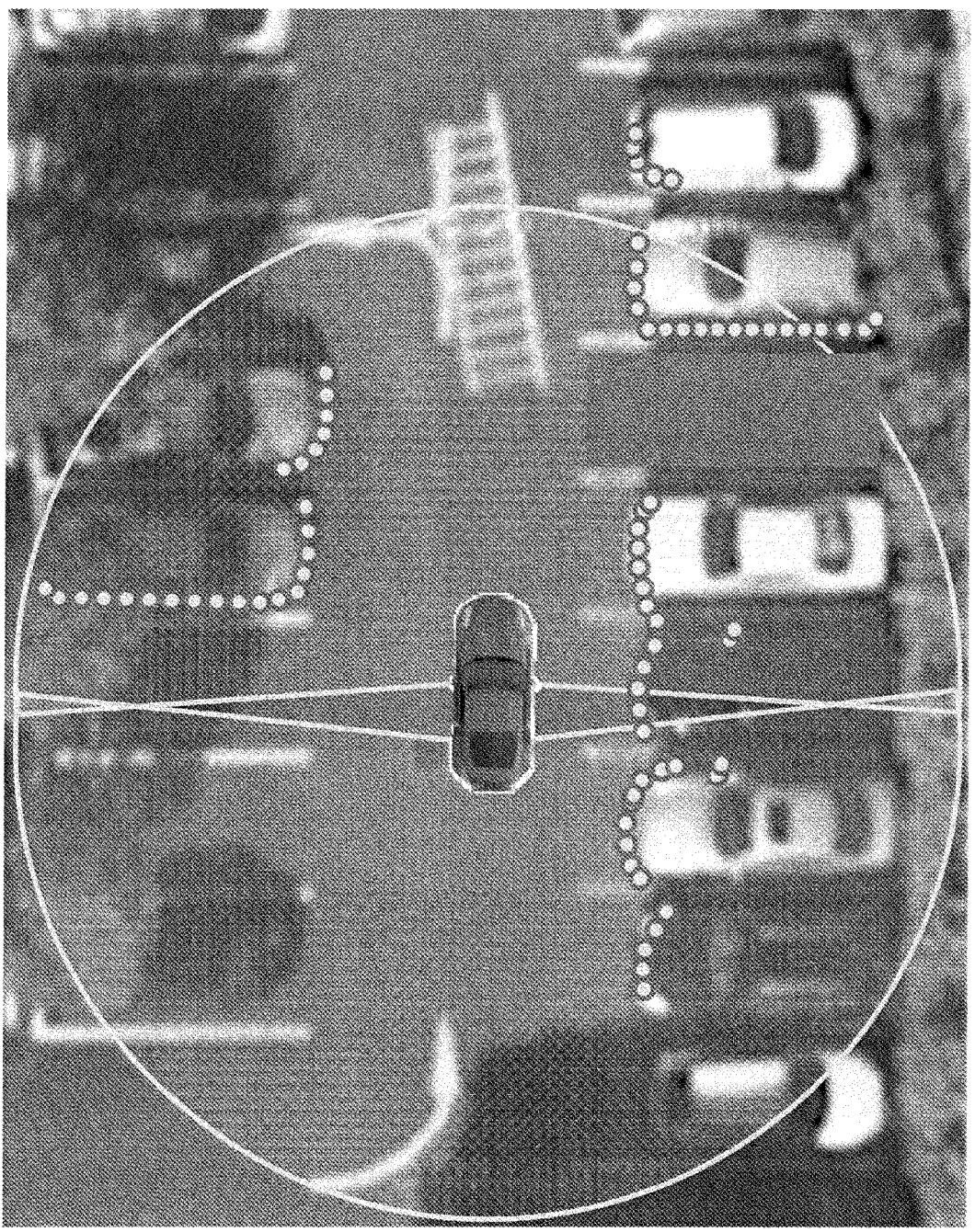
FIG. 9 is a display screen view in which the state where a self-vehicle performs sensing by means of a distance measurement sensor at a given point in a parking lot is displayed on the display apparatus.

FIG. 9 is a display screen view in which the state where the self-vehicle performs sensing by means of the distance measurement sensor at a given point in the parking lot is displayed on the display apparatus. As illustrated in FIG. 9, a distance measurement area in which the self-vehicle performs sensing by means of the distance measurement sensor is displayed as the circumferential range, and pieces of sensing information are merged together along with the movement of the self-vehicle, whereby the profile of each detected peripheral vehicle is displayed as an alignment of small circle marks. In this way, the self-vehicle can move within the parking lot while checking a protruding profile portion of each peripheral vehicle, and can enter a target parking space.

FIGS. 10A to 10I are display screen views each illustrating the state where a peripheral map generating process performed by peripheral map generating section 44 of the computation apparatus is displayed on the display apparatus. First, as illustrated in FIG. 10A, an aerial photograph to be measured in a desired parking lot is displayed on the display screen. Subsequently, if the self-vehicle enters the parking lot, as illustrated in FIG. 10B, a profile screen of peripheral vehicles detected at time t1 is displayed on the display apparatus. Subsequently, as illustrated in FIG. 10C, a profile screen of peripheral vehicles detected at time t2 is displayed on the display apparatus.

In this manner, as illustrated in FIGS. 10D, 10E, and 10F, profile screens of peripheral vehicles respectively detected at time t3, time t(n−1), and time tn are displayed on the display apparatus. Then, as illustrated in FIG. 10G, a measurement screen of the vehicle profile obtained by fusing the screens from the time t1 to the time tn together in a time-series manner is displayed on the display apparatus. As a result, as illustrated in FIG. 10H, an updated aerial photograph in which only the periphery of a parking target position is reflected is displayed on the display apparatus. Alternatively, as illustrated in FIG. 10I, the latest aerial photograph in which the entire sensing region is reflected may also be displayed on the display apparatus as needed.

FIGS. 11A to 11G are display screen views when pieces of time-series information about a moving vehicle (moving object) in a parking lot are merged together. Normally, if pieces of time-series sensing information about the moving object are simply merged together, a past trace thereof unfavorably remains in a peripheral map, and hence the update is performed using only the latest information. That is, it is assumed that, as illustrated in a display screen view at time t1 above FIGS. 11A to 11G, a moving vehicle that starts moving to go out of a parking space exists while the self-vehicle waits at the entrance of the parking lot. In this case, the moving vehicle moves to go out of the parking space as illustrated in respective display screen views at time t2, time t3, . . . , and time tn above FIGS. 11A to 11G. In this case, information about the moving vehicle is displayed on the screen as illustrated in FIGS. 11A to 11F, whereas the trace of the moving vehicle is not displayed unlike FIG. 11G.

That is, the moving vehicle that is measured at the time t1 in a map area is not displayed at the time t2 and thereafter even if the moving vehicle is still located within a measurable range. Further, an object that does not exist at the time t1 exists at the time t2 and thereafter although the object is located within the measurable range in the map area. In this way, pieces of information about the moving vehicle from the time t1 to the time tn are not merged together unlike FIG. 11G, and only the latest information about the moving vehicle at the time tn is displayed for use on the display apparatus as illustrated in FIG. 11F.

FIGS. 12A to 12E illustrate an example interpolation process for a non-sensing region in which part of a vehicle cannot be sensed by the distance measurement sensor. That is, in the case where the distance measurement sensor of the self-vehicle senses a parked vehicle, as illustrated in FIG. 12B, an opposite side surface and a back portion of the parked vehicle cannot be sensed by the distance measurement sensor. Accordingly, if a one-side image region of the parked vehicle is obtained as the sensing result thereof as illustrated in FIG. 12C, the image region as the sensing result is folded back along the central line of the vehicle width, whereby a pseudo-image is combined as illustrated in FIG. 12D. Then, the back portion that cannot be sensed in a back end portion of the parked vehicle is approximated by a straight line, whereby a composite image of the parked vehicle is completed as illustrated in FIG. 12E. If composite images thus created of parked vehicles are merged together, such a sensing merging result screen as illustrated in FIG. 12A is displayed on the display apparatus.

FIGS. 13A to 13E illustrate another example interpolation process for a non-sensing region. In the case where only a front region of a parked vehicle is sensed as illustrated in FIG. 13B as a result of sensing of the parked vehicle by the distance measurement sensor of the self-vehicle, an image region as the sensing result is folded back along the central line of the vehicle width, whereby a pseudo-image is synthesized as illustrated in FIG. 13C. Consequently, such a composite image of the parked vehicle as illustrated in FIG. 13D is created. Then, with regard to a portion that cannot be sensed in a back end portion of the parked vehicle, the profile line of a vehicle back portion is approximated by a rectangular shape such that a measured vehicle width and a predetermined vehicle length are satisfied, whereby a composite image of the parked vehicle is completed as illustrated in FIG. 13E. If composite images thus created of parked vehicles are merged together, such a sensing merging result screen as illustrated in FIG. 13A is displayed on the display apparatus.

Hereinabove, the parking assistance apparatus according to the present invention has been specifically described by way of some embodiments and examples. The present invention is not limited to the above-mentioned embodiments, and can be variously changed within a range not departing from the gist thereof.

Note that, although the current position of the self-vehicle is detected using the GPS in each embodiment, the present invention is not limited thereto, and techniques other than the GPS can also be used as long as the used techniques can detect the current position of the self-vehicle.

The "aerial photograph" in the present invention includes a photograph acquired at a sufficient altitude (for example, several hundred meters or higher in the sky), and is a concept including photographs other than photographs acquired from aircrafts, such as satellite photographs.

The disclosure of the specification, drawings, and abstract in Japanese Patent Application No. 2012-080814 filed on Mar. 30, 2012 is incorporated herein by reference in its entirety.

INDUSTRIAL APPLICABILITY

The present invention can be effectively used as a parking assistance apparatus for a popular car in which a vehicle navigation system is mounted.

REFERENCE SIGNS LIST 1a, 1b, 1c Parking Assistance Apparatus
2 Distance Measurement Sensor
3 GPS Receiver
4a, 4b, 4c Computation Apparatus
5 Display Apparatus
6 Communication Apparatus
7 Camera
41 self-vehicle Position Detecting Section
42 Peripheral Object Detecting Section
43 Aerial Photograph Storing Section
44 Peripheral Map Generating Section
45 Aerial Photograph Acquiring Section

The invention claimed is:

1. A parking assistance apparatus for providing parking assistance for a self-vehicle using image information displayed inside the self-vehicle, the apparatus comprising:
   a memory storing past aerial photographs of a number of parking areas acquired by at least one camera; and
   a computer configured to:
   detect a position of the self-vehicle;
   access the past aerial photographs stored in the memory;
   based on the stored past aerial photographs and the detected position of the self-vehicle, generate an aerial photograph corresponding to the detected position of the self-vehicle;
   store the aerial photograph corresponding to the detected position of the self-vehicle;
   create a distance map on a basis of distance measurement data acquired by scanning a periphery of the self-vehicle using a distance measurement sensor mounted on the self-vehicle, the distance measurement data indicating a distance between the self-vehicle and a peripheral object;
   update the stored aerial photograph, on a basis of the created distance map, and generate a latest peripheral map;
   display, on a screen, the generated latest peripheral map generated; and
   interpolate a pseudo-image formed by folding back an image along a central line in a width direction or a length direction of a parked vehicle, as a region that is not sensed as a result of scanning of the parked vehicle by the distance measurement sensor.

2. A parking assistance apparatus for providing parking assistance for a self-vehicle using image information displayed inside the self-vehicle, the apparatus comprising:
   a memory storing past aerial photographs of a number of parking areas acquired by at least one camera; and
   a computer configured to:
   detect a position of the self-vehicle on a basis of a Global Positioning System ("GPS") data acquired from a GPS;
   access the past aerial photographs stored in the memory;
   based on the stored past aerial photographs and the detected position of the self-vehicle, acquire an aerial photograph corresponding to the detected position of the self-vehicle;
   create a distance map on a basis of distance measurement data acquired by scanning a periphery of the self-vehicle using a distance measurement sensor mounted on the self-vehicle, the distance measurement data indicating a distance between the self-vehicle and a peripheral object;
   update, on a basis of the created distance map, the acquired aerial photograph, and generate a latest peripheral map;
   display, on a screen, the generated latest peripheral map; and
   interpolate a pseudo-image formed by folding back an image along a central line in a width direction or a length direction of a parked vehicle, as a region that is not sensed as a result of scanning of the parked vehicle by the distance measurement sensor.

3. The parking assistance apparatus according to claim 1, wherein the computer is further configured to, when the distance measurement sensor detects a moving object, create the distance map on a basis of the distance measurement data and detection information of the moving object.

4. The parking assistance apparatus according to claim 1, further comprising a camera that takes an image of a peripheral area of the self-vehicle, wherein the computer updates the stored aerial photograph with reference to a photograph image taken by the camera, and generates the latest peripheral map.

5. The parking assistance apparatus according to claim 4, wherein the computer is further configured to:
   when no parked vehicle exists in a zone surrounded by a parking line on a basis of the photograph image taken by the camera, superimpose an image representing an empty space onto an inside of the zone surrounded by the parking line of the empty space, and
   when a parked vehicle exists in the zone surrounded by the parking line on a basis of the photograph image taken by the camera, superimpose an image representing the existence of the parked vehicle onto an inside of a profile of the parked vehicle.

6. The parking assistance apparatus according to claim 5, wherein the image representing the empty space is one of an image including a texture of a color substantially identical to that of a road surface in a periphery of the parking line, and an image including character information representing that the space is an empty space.

7. The parking assistance apparatus according to claim 5, wherein the image representing the existence of the parked vehicle is one of an image including a profile of the parked vehicle, and an image obtained by filling the image including the profile with a color substantially identical to that of the parked vehicle.

8. The parking assistance apparatus according to claim 6, wherein, when the self-vehicle is entering the empty space, the computer displays on the screen a profile of an outer edge of the self-vehicle during movement of the self-vehicle.

9. A parking assistance apparatus for providing parking assistance for a self-vehicle, the apparatus comprising:
   a memory storing past aerial photographs of a number of parking areas acquired by at least one camera; and
   a computer configured to:
      detect a position of the self-vehicle;
      access the past aerial photographs stored in the memory;
      based on the stored past aerial photographs and the detected position of the self-vehicle, generate an aerial photograph corresponding to the detected position of the self-vehicle;
      superimpose an image in accordance with existence or non-existence of another vehicle in a periphery of the self-vehicle onto the aerial photograph corresponding to the detected position of the self-vehicle;
      display the superimposed image on a screen; and
      interpolate a pseudo-image formed by folding back an image along a central line in a width direction or a length direction of a parked vehicle, as a region that is not sensed as a result of scanning of the parked vehicle by a distance measurement sensor.

10. A parking assistance method for providing parking assistance for a self-vehicle using image information displayed inside the self-vehicle, the method comprising:
   storing past aerial photographs of a number of parking areas acquired by at least one camera;
   detecting a position of the self-vehicle;
   accessing the past aerial photographs stored in the memory;
   based on the stored past aerial photographs and the detected position of the self-vehicle, generating an aerial photograph corresponding to the detected position of the self-vehicle;
   storing the aerial photograph corresponding to the position of the self-vehicle;
   creating a distance map on a basis of distance measurement data acquired by scanning a periphery of the self-vehicle using a distance measurement sensor mounted on the self-vehicle, the distance measurement data indicating a distance between the self-vehicle and a peripheral object;
   updating the aerial photograph on a basis of the distance map, and generating a peripheral map; and
   displaying the peripheral map on a display apparatus, wherein
   a pseudo-image formed by folding back an image along a central line in a width direction or a length direction of a parked vehicle, is interpolated as a region that is not sensed as a result of scanning of the parked vehicle by the distance measurement sensor.

11. A parking assistance method for providing parking assistance for a self-vehicle using image information displayed inside the self-vehicle, the method comprising:
   storing past aerial photographs of a number of parking areas acquired by at least one camera;
   detecting a position of the self-vehicle on a basis of a Global Positioning System ("GPS data") acquired from a GPS;
   based on the stored past aerial photographs and the detected position of the self-vehicle, acquiring an aerial photograph corresponding to the position of the self-vehicle, from an outside via a communication section;
   creating a distance map on a basis of distance measurement data acquired by scanning a periphery of the self-vehicle using a distance measurement sensor mounted on the self-vehicle, the distance measurement data indicating a distance between the self-vehicle and a peripheral object;
   updating the aerial photograph on a basis of the distance map, and generating a latest peripheral map; and
   displaying the latest peripheral map on a display apparatus, wherein
   a pseudo-image formed by folding back an image along a central line in a width direction or a length direction of a parked vehicle, is interpolated as a region that is not sensed as a result of scanning of the parked vehicle by the distance measurement sensor.

12. The parking assistance method according to claim 10, wherein the creating the distance map includes creating, when the distance measurement sensor detects a moving object, the distance map on a basis of the distance measurement data and detection information of the moving object.

* * * * *